United States Patent
Halbert et al.

(10) Patent No.: US 9,904,591 B2
(45) Date of Patent: *Feb. 27, 2018

(54) DEVICE, SYSTEM AND METHOD TO RESTRICT ACCESS TO DATA ERROR INFORMATION

(71) Applicant: Intel Corporation

(72) Inventors: John B. Halbert, Beaverton, OR (US); Kuljit S. Bains, Olympia, WA (US); Debaleena Das, Los Gatos, CA (US); Bill Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/918,428

(22) Filed: Oct. 20, 2015

(65) Prior Publication Data

US 2016/0117219 A1    Apr. 28, 2016

Related U.S. Application Data

(60) Provisional application No. 62/067,306, filed on Oct. 22, 2014.

(51) Int. Cl.
*G11C 29/00* (2006.01)
*G06F 11/10* (2006.01)
*G06F 11/07* (2006.01)
*G06F 13/00* (2006.01)
*G06F 11/08* (2006.01)

(52) U.S. Cl.
CPC ........ *G06F 11/1004* (2013.01); *G06F 11/073* (2013.01); *G06F 11/076* (2013.01); *G06F 11/0772* (2013.01); *G06F 11/08* (2013.01); *G06F 13/00* (2013.01)

(58) Field of Classification Search
None
See application file for complete search history.

(56) References Cited

U.S. PATENT DOCUMENTS 5,633,767 A * 5/1997 Boutaghou .............. G11B 5/54
                                                     360/53
9,047,082 B2 * 6/2015 Gopal ................. G06F 9/30018
(Continued)

OTHER PUBLICATIONS

International Search Report and Written Opinion for PCT Patent Application No. PCT/US2016/034849, dated Sep. 8, 2016, 11 pages.

(Continued)

*Primary Examiner* — M. Mujtaba Chaudry
(74) *Attorney, Agent, or Firm* — Compass IP Law PC

(57) ABSTRACT

Techniques and mechanisms to provide selective access to data error information by a memory controller. In an embodiment, a memory device stores a first value representing a baseline number of data errors determined prior to operation of the memory device with the memory controller. Error detection logic of the memory device determines a current count of data errors, and calculates a second value representing a difference between the count of data errors and the baseline number of data errors. The memory device provides the second value to the memory controller, which is unable to identify that the second value is a relative error count. In another embodiment, the memory controller is restricted from retrieving the baseline number of data errors.

25 Claims, 6 Drawing Sheets

(56) References Cited

U.S. PATENT DOCUMENTS

| | | | |
|---|---|---|---|
| 2002/0116150 A1* | 8/2002 | Franke | F02D 41/22 702/185 |
| 2004/0078685 A1* | 4/2004 | Glass | G06F 11/3656 714/38.14 |
| 2007/0204201 A1* | 8/2007 | Gower | G06F 11/1044 714/767 |
| 2009/0132876 A1 | 5/2009 | Freking et al. | |
| 2010/0235713 A1 | 9/2010 | Lee et al. | |
| 2010/0332900 A1 | 12/2010 | Yang | |
| 2011/0145633 A1* | 6/2011 | Dickens | G06F 11/073 714/6.1 |
| 2014/0204671 A1* | 7/2014 | Sharon | G11C 11/5642 365/185.09 |
| 2014/0250340 A1 | 9/2014 | Cordero et al. | |
| 2014/0337688 A1 | 11/2014 | Billing et al. | |
| 2015/0067437 A1 | 3/2015 | Bains et al. | |
| 2015/0074498 A1 | 3/2015 | Varanasi | |
| 2015/0223333 A1 | 8/2015 | Ware et al. | |
| 2015/0234707 A1 | 8/2015 | Vogelsang et al. | |
| 2015/0243373 A1* | 8/2015 | Chun | G06F 12/0246 714/710 |
| 2015/0278012 A1* | 10/2015 | Gjorup | G06F 11/076 714/704 |
| 2016/0034346 A1 | 2/2016 | Michael | |
| 2016/0041869 A1 | 2/2016 | Davis et al. | |
| 2016/0283318 A1 | 9/2016 | Das et al. | |
| 2016/0284424 A1 | 9/2016 | Das et al. | |

OTHER PUBLICATIONS

Notice of Allowance, U.S. Appl. No. 14/865,956, dated Apr. 13, 2017, 5 pages.

Office Action for U.S. Appl. No. 14/865,956, dated Dec. 6, 2016, 9 pages.

* cited by examiner

DEVICE, SYSTEM AND METHOD TO RESTRICT ACCESS TO DATA ERROR INFORMATION

RELATED APPLICATIONS

This application is a nonprovisional application based on U.S. Provisional Patent Application No. 62/067,306 filed Oct. 22, 2014, and claims the benefit of priority of that provisional application. Provisional Application No. 62/067,306 is hereby incorporated by reference.

BACKGROUND

1. Technical Field

Embodiments of the invention generally relate to the field of integrated circuits and more particularly, but not exclusively, to communication of error detection information with a memory device.

2. Background Art

Memory devices are susceptible to errors such as transient (or soft) errors. If these errors are not handled properly, they can cause a computing system to malfunction. Redundant information in the form of error correcting codes (ECCs) can be used to improve overall system reliability. Typically, a memory controller performs error correction coding operations to generate and/or evaluate such redundant information for a plurality of data bits.

The redundant information is often stored in the memory with the corresponding plurality of data bits to allow the memory controller to recover the plurality of data bits if errors are introduced in one or more of the plurality of data bits during transmission to/from the memory or while being stored in the memory. The redundant information, however, increases the storage requirement of the memory system and, thereby, increases the cost of the memory system. Thus, ECC is typically used for comparatively high-end or mission critical applications.

Recently, error detection logic has been incorporated on-die with integrated memory circuit devices. On-die ECC can correct single bit errors before a controller or other external agent reads the data. Increasing occurrences in data errors are associated with failure, or expected future failure, of a memory device. On-die errors are likely to have an increasing impact on memory performance as the fabrication processes such as those for dynamic random access memory (DRAM) circuitry continues to scale to smaller geometries. Therefore, access to data error information from such memory devices is useful for platforms to anticipate possible memory failure.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
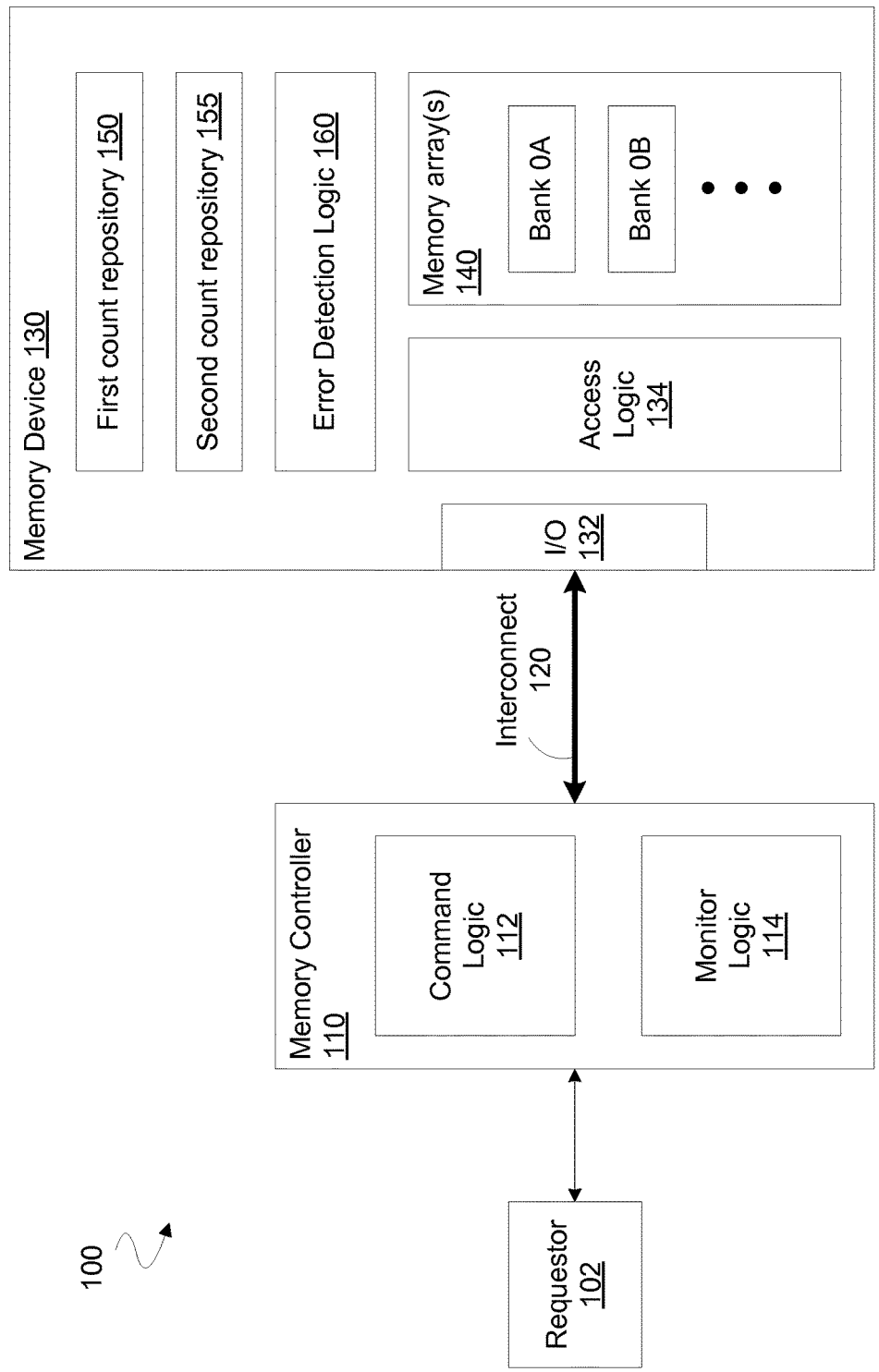
FIG. 1 is a block diagram illustrating elements of a system for determining data error information according to an embodiment.

Embodiments discussed herein variously relate to techniques or mechanisms for a memory controller (or other agent) external to a memory device to be able to detect one or more data errors which the memory device detects locally. The memory device may comprise at least one array of memory cells (referred to herein as a "memory array") that, for example, comprise a memory core of the memory device. The memory device may comprise one or more memory arrays that, for example, all reside on a single integrated circuit chip or, alternatively, variously reside each on a respective one of multiple IC chips. For example, the memory device may be an integrated circuit (IC) chip including one or more memory arrays. In another embodiment, the memory device comprises a packaged device including a plurality of IC chips, some or all of which each comprise a respective one or more of the memory arrays. The memory device may include any of a variety of memory types that are susceptible to soft errors. For example, the memory device may be a dynamic random access memory (DRAM) and/or static random access memory (SRAM). Such soft errors may be due to alpha particles, although certain embodiments are not limited to counting errors of a particular origin.

A memory device according to an embodiment includes one or more memory arrays and error detection circuit logic that, for example, includes or couples to error correction logic of the memory device. The error detection logic may detect for errors of data stored by the one or more memory arrays—e.g. where an IC die (for brevity, referred to herein as a 'die') of the memory device includes both the one or more memory arrays and the error detection circuitry. In an embodiment, error count information is stored by the memory device—e.g. in a mode register of the memory device—based on the error detection logic counting occurrences of data errors. Some (e.g., not all) error count information may be available for access by an agent that is external to the memory device. Such access may provide for improved insight into memory operation and improved management of such operation.

Certain features of various embodiments are described herein with reference the use of error correction code (ECC) values by a dynamic random access memory (DRAM) device to determine a count of data errors. However, certain embodiments are not limited to DRAM devices and/or the use of ECC values, and any of a variety of additional or alternative types of memory devices and/or error detection information may be used to determine a count of data errors, according to different embodiments. For example, determining a count of data errors may include performing any of a variety of error detection calculations. An error detection calculation may be based on a processing of data to determine a first error detection value that is to be subsequently compared to, or otherwise evaluated based on, another error detection value that is calculated based on an earlier version (or alternatively, a later version) of that data. Such an error detection value may include a parity value, checksum, cyclic redundancy check (CRC) value, cryptographic hash, forward error correction (FEC) code such as a Hamming code and/or any of a variety of other such values.

Errors can accumulate within a memory device (e.g., DRAM) during the lifetime of the device. However, if the DRAM (or other memory device) has on-die ECC, such errors may be un-detected by an external host—e.g., since the on-die ECC would correct single bit errors in the DRAM. Typically, an original equipment manufacturer (OEM) of memory devices tracks the number of single bit errors in a DRAM, dual in-line memory module (DIMM) or other such memory devices—e.g., to predict when devices need to be replaced before they fail. For memory devices that ship with on-die error detection, the number of errors shipped with such devices would be valuable information for commercial competitors to have—e.g., for understanding the health of the supplier's fabrication processes. Embodiments discussed herein variously protect access to information identifying such a number of errors.

As discussed herein, embodiments variously provide relative error count mechanisms and/or techniques for a DRAM or other memory device to track data error accumulation. Such a relative error count may be relative to a baseline number of errors determined at some reference ("time zero") time—e.g. when a supplier fabricates, tests or ships a DRAM. A user or other agent can run a test while the DRAM is operating as part of a memory system and find out if there are newer errors that have been detected by the DRAM during its lifetime. However, the baseline number of errors and/or a total number of true errors in the DRAM may be inaccessible to the user/agent.

The technologies described herein may be implemented in one or more electronic devices. Non-limiting examples of electronic devices that may utilize the technologies described herein include any of various types of mobile devices and/or stationary devices, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, wearable electronics, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of various electronic devices configured to provide a count of data errors in a memory.

Embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

FIG. 1 illustrates elements of a system 100 to provide data error information according to an embodiment. System 100 represents any of a number of computing systems (or a sub-system thereof) that may include memory which supports error detection functionality. Such computing systems may include servers, desktops, laptops, mobile devices, smartphones, gaming devices, and others.

System 100 may include a memory device 130 coupled to a memory controller 110 via an interconnect 120. Memory controller 110 is to control, at least in part, a transfer of information between a requester 102 and memory device 130. Requester 102 may be a processor (e.g., a central processing unit and/or a core), a service processor, an input/output device (e.g., a peripheral component interconnect (PCI) Express device), memory itself, or any other element of system 100 that requests access to memory. In some embodiments, memory controller 110 is on the same die as requester 102.

Memory device 130 may include any of a variety of types of memory technology that, for example, have rows of memory cells, where data is accessible via a wordline or the equivalent. In one embodiment, memory device 130 includes dynamic random access memory (DRAM) technology such as that which operates according to a Dual Data Rate (DDR) specification, a Low Power DDR (LPDDR) specification or other such memory standard.

In addition to, or alternatively to, volatile memory, in some embodiments, reference to memory devices can refer to a nonvolatile memory device whose state is determinate even if power is interrupted to the device, for such devices that have a bank group architecture. In one embodiment, the nonvolatile memory device is a block addressable memory device, such as NAND or NOR technologies. Thus, a memory device can also include a future generation nonvolatile devices, such as a three dimensional crosspoint memory device, or other byte addressable nonvolatile memory device. In one embodiment, the memory device can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Memory device 130 may be an integrated circuit package within a larger memory device (not shown) of system 100. For example, memory device 130 may be a DRAM device of a memory module such as a dual in-line memory module (DIMM).

Memory device 130 may include one or more memory arrays 140, which represent one or more logical and/or physical groups of memory. An example of one such grouping of memory is a bank of memory resources which, for example, may include an array of storage elements arranged in rows and columns. By way of illustration and not limitation, portions of one or more memory arrays 140 may include (e.g. be configured to operate as) one or more banks, as represented by the illustrative banks 0A, 0B.

Memory device 130 may include access logic 134 to facilitate, at least in part, access to one or more memory arrays 140—e.g. where such access is provided for servicing one or more commands from memory controller 110. Access logic 134 may include, or operate in conjunction with, logic of memory device 130 which (for example) provides resource access at least in part according to conventional techniques. By way of illustration and not limitation, access logic 134 may include or couple to column logic and/or row logic (not shown) which are used to decode an access instruction to the proper memory location within one or more memory arrays 140.

In an embodiment, memory controller 110 may send commands or instructions to memory device 130 over one or more buses, as represented by the illustrative interconnect 120 coupling I/O circuitry 132 of memory device 130 to memory controller 110 and/or one or more other memory devices (not shown). Such commands may be interpreted by memory device 130—e.g. including access logic 134 decoding command information to perform a variety of access functions within the memory and/or decoding address information with column logic and/or row logic. For example, such logic may access a specific location in one or more memory arrays 140 with a combination of a column address strobe or signal (CAS) and a row address strobe or signal (RAS). Rows of memory may be implemented in accordance with known memory architectures or their derivatives. Briefly, a row of one or more memory arrays 140 may include one or more addressable columns of memory cells, as identified by the CAS generated by column logic of memory device 130. The rows may each be variously addressable via the RAS generated by row logic of memory device 130. Access to one or more memory arrays 140 may be for the purpose of writing data exchanged (and/or reading data to be exchanged) via a data bus which, for example, is included in interconnect 120.

Memory device 130 may store data bits and, in an embodiment, further store corresponding error check bits—e.g., error correction code (ECC) bits—for such data bits in one or more memory arrays 140. Memory device 130 may also include on-die error detection logic 160. In some embodiments, error detection logic 160 enhances the reliability, availability, and serviceability (RAS) of memory device 130. More particularly, in some embodiments, error detection logic 160 enables memory device 130 to identify whether one or more of data bits have been corrupted based on corresponding error check bits which, for example, may also be stored in memory device 130. In some embodiments, error detection logic 160 includes, for example, ECC computation logic and comparison logic. An example of such error detection logic according to one embodiment is further discussed below with reference to FIG. 3. This computation and comparison logic may enable memory device 130 to locally compute ECC bits for data—e.g. during a read of such data—and to compare the locally computed ECC bits with stored ECC bits. If the locally computed ECC bits do not match the stored ECC bits, then error detection logic 160 may store state information which is descriptive or otherwise indicative of the data error represented by such a mismatch.

In the illustrated embodiment, memory device 130 includes a first count repository 150 and a second count repository 155 each to store respective state information related to errors of one or more memory arrays 140. In some embodiments, one of first count repository 150 and a second count repository 155 (e.g., only one) includes one or more bits of a register—such as that of a mode register set (MRS)—which may be read by memory controller 110. However, the memory controller may be restricted from reading at least some portion of first count repository 150 and second count repository 155.

At some reference time—e.g., during manufacturing and/or testing of memory device 130—a first value representing a total number of data errors of at least one error type (such as single-bit errors) may be stored in first count repository 150—e.g., where first count repository 150 includes non-volatile storage cells. The first value may represent the total number of single bit errors detected during a manufacturing test. A register or other circuitry of first count repository 150 may limit the number of errors to be represented by the first value to some maximum—e.g., 4096 errors. The error register may not be directly readable by memory controller 110 and/or some other agent external to memory device 130.

Memory controller 110 may include command logic 112—e.g. including any of a variety of hardware logic and/or executing software logic—to send commands via interconnect 120. Command logic 112 may include or couple to logic of memory controller 110 which performs operations to generate, transmit or otherwise determine commands which are sent according to one or more conventional techniques. By way of illustration and not limitation, command logic 112 and/or monitor logic 114 may provide (and in some embodiments, supplement) otherwise conventional command/address signaling functionality which, for example, conforms to some or all requirements of a dual data rate (DDR) specification such as the DDR3 SDRAM JEDEC Standard JESD79-4, September 2012 or the like.

Monitor logic 114 may comprise circuitry and/or executing software to detect and/or otherwise evaluate data error events detected by error detection logic 160. Thus, monitor logic 114 enables memory controller 110 to monitor, track, and possibly store information describing data errors which are detected (and in an embodiment, corrected) external to memory controller 110. Some data error events might otherwise be transparent to memory controller 110, but for functionality variously provided by certain embodiments. In an embodiment, baseline data errors remain transparent to memory controller 110.

Command logic 112 may send to memory device 130 a command (e.g. a mode register GET command) to read state information stored in second count repository 155. Such a command may be sent by memory controller 110 in response to one or more signals indicating that memory device 130 has internally (locally) counted one or more data errors. In response to such a command, monitor logic 114 may receive a relative error count stored in second count repository 155 based on operations of error detection logic 160. In an embodiment, monitor logic 114 enables memory controller 110 to adapt memory management techniques based upon such a relative error count—e.g., where memory controller 110 is unaware that the value retrieved from second count repository 155 represents a relative (as opposed to absolute) error count. The relative count may be sufficient for an entity such as an original equipment manufacturer (OEM) to predict failure of memory device 130. However, at least some agents may be prevented from accessing more detailed information, including or otherwise based on a baseline error count, which describes overall lifetime performance of such a memory.

In some embodiments, memory device 130 may restrict or otherwise limit access to a repository (e.g., including first count repository 150) by at least some agent outside of memory device 130—e.g., where the repository is to store a value representing a number of one or more errors. For example, memory device 130 may be configured to communicate with memory controller 110 (or other host logic) according to an interface protocol, wherein any command to read the repository is of a command type other than any command type of the interface protocol. Alternatively or in addition, any command to determine an address of the second repository may be of a command type other than any command type of the interface protocol. In some embodiments, an accessibility of the repository may be locked by a privilege or other security mechanism, where any command to unlock the accessibility of the repository is of a command type other than any command type of the interface protocol. Any of a variety of additional or alternative mechanisms may be provided to restrict access by a memory controller or other host logic from directly accessing a baseline number of data errors (e.g., used to generate a relative error count based on a current count of errors). By contrast, such a baseline number of errors may be accessible via one or more signals that are available on a restricted basis to a manufacturer, licensee or other authorized agent.

In an embodiment, a method at a memory device determines a number of errors of at least one error type (e.g., single-bit errors) relative to an error count determined at some earlier reference time. When an error counter of a DRAM (or other memory device) is enabled, the DRAM may update (e.g., increment) the counter every time a single bit error is detected—e.g., during error detection and correction while servicing a READ command. A difference between the previously-stored baseline error count information and the current number of counted data errors may be read from a count repository—e.g., with a multi-purpose register (MPR) read command.

The error counter may be cleared during reset and/or selectively enabled/disabled by setting a bit A[y] of a mode register MRx. Once enabled, the counter may be incremented or otherwise updated for every read that detects a single bit error. Although certain embodiments are not limited in this regard, if an individual location that has a single bit error is read multiple times, the error counter may increment every time the location is read. Accordingly, certain embodiments further account for how memory locations are read (e.g., the number of times they are read) and whether that is to affect the relative error count. Once a single pass through all of the memory locations (or multiple passes) has been completed, a value representing the relative error count result may be read from a mode register or other repository. The register contains the difference between the number of errors recently detected and the previously stored baseline error count. A negative number may indicate that less errors have been detected than at a reference time $t_0$, a positive number may indicate that more errors have been detected than at reference time $t_0$.

Figure 2:
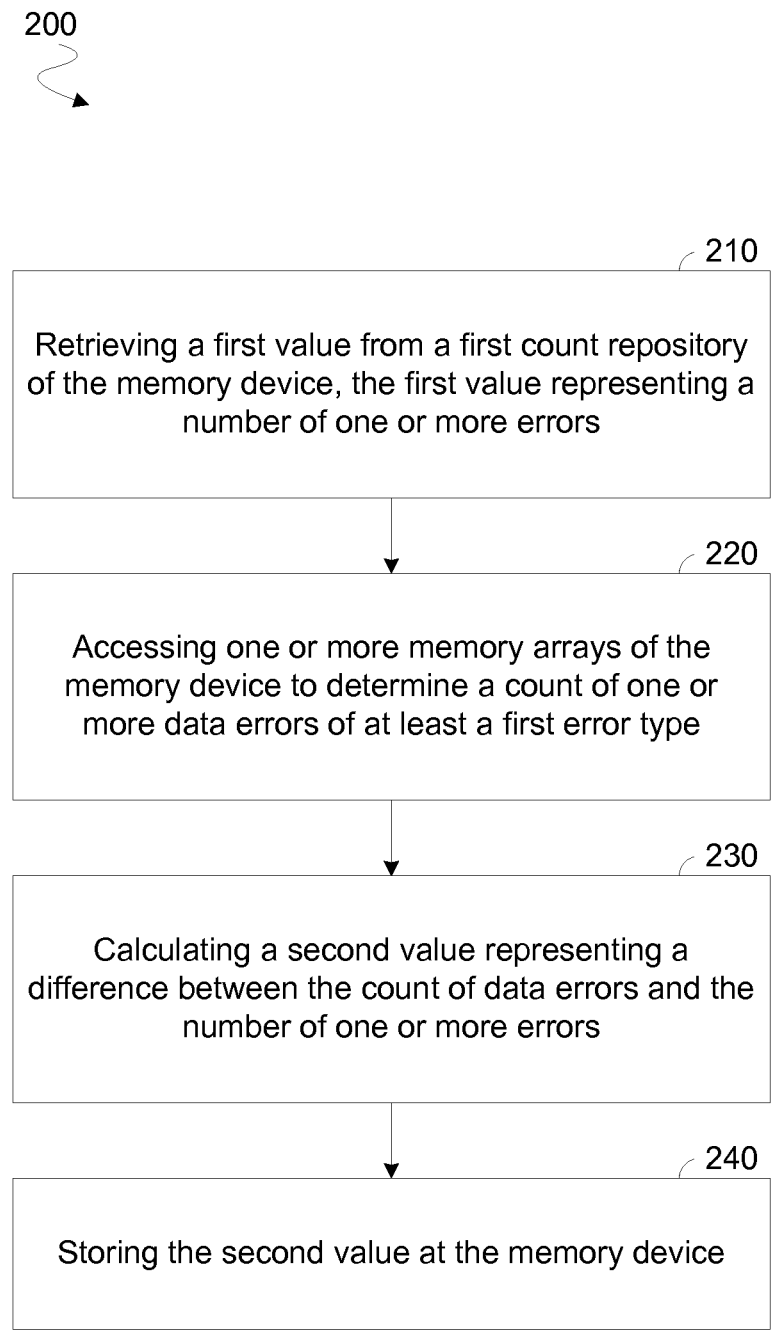
FIG. 2 is a flow diagram illustrating elements of a method for operating a memory device according to an embodiment.

FIG. 2 illustrates elements of the method 200 to determine data error information according to an embodiment. Method 200 may be performed at a memory device having some or all of the features of memory device 130, for example. The memory device may comprise a single IC die or a packaged IC device. In an embodiment, the memory device comprises a printed circuit board and one or more packaged IC devices coupled thereto. For example, the memory device may comprise a dual in-line memory module (DIMM). The memory device may comprise a hardware interface to couple the memory device to a memory controller. Such an interface may include contacts (e.g., pins, pads, balls and/or the like) to couple the memory device to signal lines of an interconnect. The interconnect may comprise one or more buses including, for example, a data bus, command bus, address bus, command/address bus and/or the like. One or more memory arrays of the memory device may include circuitry configured to store data provided to the memory device from the memory controller via the hardware interface. Such one or more memory arrays may comprise an array of dynamic random access memory (DRAM) cells. In an embodiment, the memory device operates according to any of a variety of DDR standards.

Method 200 may comprise, at 210, retrieving a first value from a first count repository of the memory device, the first value representing a number of one or more errors (e.g., other than any error of data written to one or more memory arrays of the memory device by a memory controller coupled to the memory device). The number of one or more errors may provide a baseline for providing a count representing a relative change between the baseline and a current number of errors.

The first count repository may comprise one or more registers or other such circuitry to store or otherwise provide the first value. The number of one or more errors represented by the first value may be a total number of errors of at least one type, where the total number is determined at some reference time. Such a reference time may be, for example, during packaging or other fabrication processing of the memory device, or during a later testing of the memory device. In an embodiment, the reference time is prior to some subsequent integration of the memory device into a larger system. For example, the reference time may be prior to a coupling of the memory device to the memory controller, incorporation of the memory device into a computer platform and/or the like.

At the reference time, error detection logic of the memory device—or, alternatively, other detection logic coupled to the memory device—may run an error detection scan of the one or more memory arrays to identify the total number of errors of at least some portion of the one or more memory arrays. Such an error detection scan may be based, for example, on a set of test data written to the one or more memory arrays for the purpose of evaluating performance of the one or more memory arrays. Based on the error detection scan, the number of one or more errors detected thereby may be identified and represented with the first value.

Access to the first value from the first count repository via the hardware interface may be at least partially restricted. For example, access to the first value via the hardware interface may be prevented during an operational mode that supports operation of the memory device with the memory controller. In such an embodiment, access to the first value via the hardware interface may be enabled during a test mode of the memory device, where the test mode is distinct from the operational mode. Accordingly, the memory controller may be prevented from identifying or otherwise detecting some or all of the errors represented by the first value.

Method 200 may further comprise, at 220, accessing the one or more memory arrays, while the memory controller is coupled to the memory device, to determine a count of one or more data errors of at least a first error type. The first error type can be single bit errors. The count of data errors determined at 220 may be based at least in part on errors of data written to the one or more memory arrays by the memory controller. In an embodiment, the accessing at 220 comprises error detection logic of the memory device scanning at least a portion—e.g. some or all banks—of the one or more memory arrays to count data errors of that portion. An IC die of the memory device may include both the one or more memory arrays and the error detection logic. Error detection and counting may include operations adapted from conventional error detection techniques, which are not detailed herein to avoid obscuring features of certain embodiments. A count of data errors may be performed at 220 after multiple distinct error detection calculations are performed each for respective data variously stored in (and/or to be stored in) the one or more memory arrays. In some embodiments, a previously determined count of data errors is successively incremented or otherwise updated—e.g., where some or all such updates are each in response to an error indicated by a respective error detection calculation.

Method 200 may further comprise, at 230, calculating a second value representing a difference between the count of data errors and the number of one or more errors. By way of illustration and not limitation, the first value may be a positive number, where the calculating at 230 includes subtracting the first value from the count of data errors by calculation logic of the memory device. Alternatively, the first value may be a negative number that is instead added to the count of data errors by such calculation logic. For example, the first value may be a 1's complement representation (or alternatively, a 2's complement representation) of such a negative number.

Method 200 may further comprise, at 240, storing the second value at the memory device, wherein the second value is available to be accessed by the memory controller. The second value may be stored, for example, at a second count repository such as a mode register. By way of illustration and not limitation, the second value may be stored to the MPR3, page 3 register of a DRAM device that supports operation according to a DDR4 specification. The stored second value may be available for access by the memory controller. For example, access logic of the memory device may be configured to service a command from the memory controller to access the second data count error value.

The second value stored at 240 may be based on both the count of data errors and a value representing a number of one or more errors that, for example, corresponds to an earlier period of time and, in some embodiments, a particular one or more data error types (e.g., but, in some embodiments, not one or more other data error types). For example, the memory device may calculate the second value by subtracting from the count of data errors the number of one or more errors. In an embodiment, the one or more memory arrays of the memory device includes volatile memory cells, wherein a number or one or more errors represents a total number of errors (of at least a particular error type) that was determined before a most recent startup of the memory device. The number or one or more errors may represent, for example, a number of errors that were determined before packaging of the memory device. Alternatively, the number or one or more errors may represent a number of errors determined after packaging of the memory device—e.g., where the number of errors was determined after coupling of the memory device to a printed circuit board.

A count of data errors may be determined (e.g., calculated by and/or communicated from the memory device) in response to any of a variety of events including, but not limited to, a startup, wake-up or other power state transition of a platform including the memory device. Alternatively or in addition, a count of errors may be determined in response to an explicit error count request from a memory controller or other host logic. In some embodiments, a memory device is programmed with (or otherwise has access to) data describing a predefined schedule of data counts—e.g., where a count of data errors is determined by the memory device in response to expiration of an interval specified by the predefined schedule.

Figure 3:
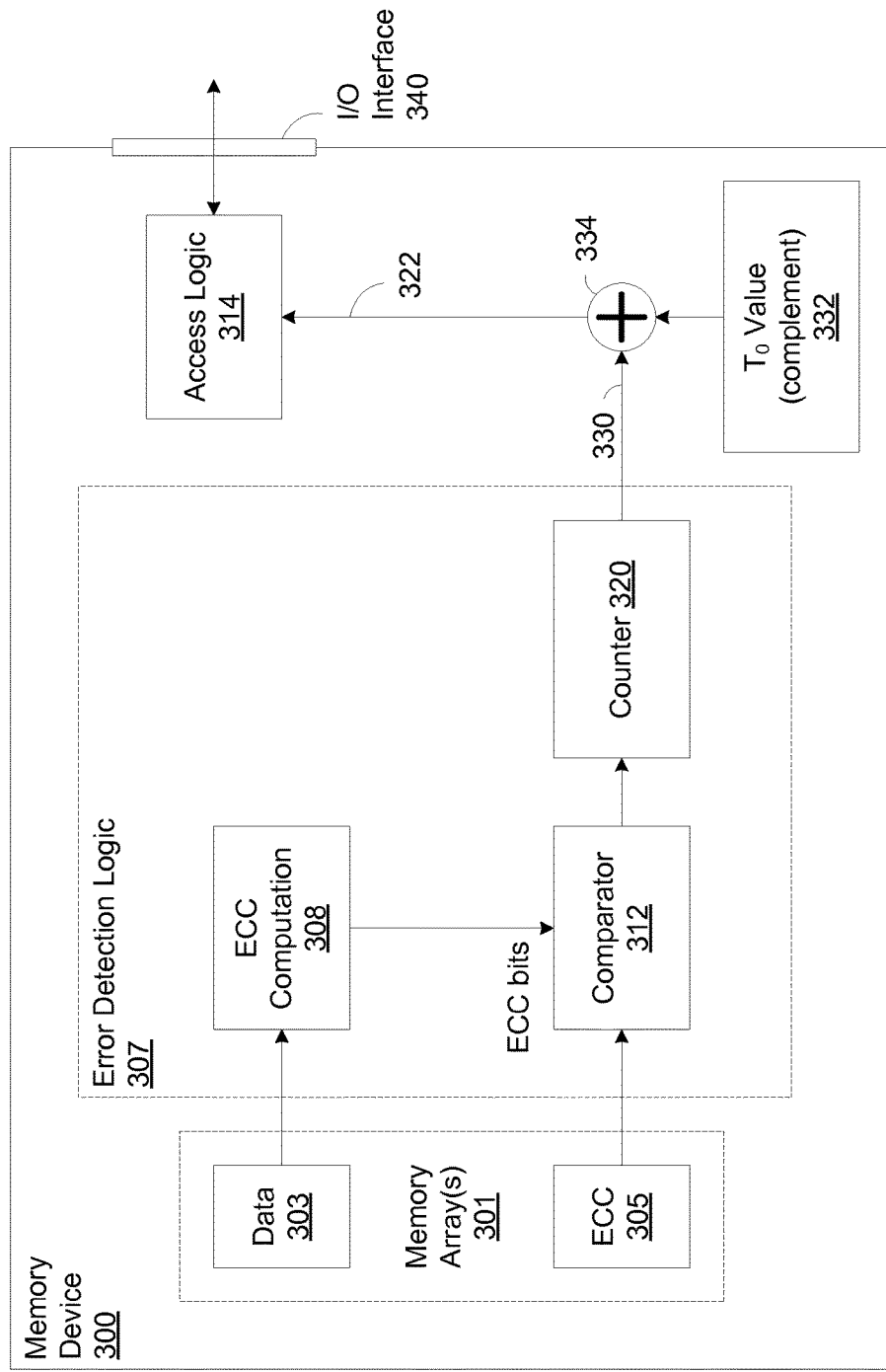
FIG. 3 is a block diagram illustrating elements of a memory device for determining data error information according to an embodiment.

FIG. 3 is a block diagram illustrating elements of a memory device 300 including on-die error detection logic according to an embodiment. Memory device 300 may include some or all of the features of memory device 130 and/or may be operated according to method 200. In some embodiments, memory device 300 (e.g., a DRAM) includes, inter alia, one or more memory arrays 301 and error detection logic 307. One or more memory arrays 301 and error detection logic 307 may be integrated onto a common chip. In an embodiment, memory device 300 includes some or all of the features of memory device 130—e.g. where one or more memory arrays 301 and error detection logic 307 correspond functionally to one or more memory arrays 140 and error detection logic 160, respectively.

At a given point during operation of memory device 300, one or more memory arrays 301 may store data bits 303 and, in some embodiments, further store corresponding ECC bits 305. Bits 303, 305 may both be stored, for example, in a common memory resource of one or more memory arrays 301 such as a single row bank, page and/or the like—e.g. where bits 303, 305 are stored in the same addressable memory location. Alternatively, bits 303, 305 may be stored in different respective resources of one or more memory arrays 301. Storage of bits 303, 305 may include operations adapted from any of a variety of conventional techniques for storing data and corresponding error detection values. Such conventional techniques are not discussed in detail herein, and are not limiting on certain embodiments.

In some embodiments, ECC bits 305 are computed locally by memory device 300—e.g. with error detection logic 307. Alternatively, ECC bits 305 may be computed by a host (e.g., memory controller 110, shown in FIG. 1) and provided to memory device 300 in a write data frame. Error detection logic 307 includes logic to check for and, in certain embodiments, correct data errors. In the illustrated embodiment, error detection logic 307 includes ECC computation logic 308, comparator 312 and counter 320. In alternative embodiments, error detection logic 307 may include more elements, fewer elements, and/or different elements. In addition, in some embodiments, one or more of the elements illustrated as being part of error detection logic 307 may be implemented in a different part memory device 300.

ECC computation logic 308 computes ECC bits based on data 303. In some embodiments, logic 308 uses the same polynomial to compute the ECC bits as was used to compute ECC bits 305. For example, logic 308 may use the same polynomial as error check logic of a memory controller (not shown) controlling memory device 300. Logic 308 may use almost any error correction code polynomial. By way of illustration and not limitation, logic 308 may compute 8 ECC bits to cover 64 data bits. In alternative embodiments, the number of ECC bits and/or data bits may be different.

Comparator 312 compares the computed ECC bits generated by logic 308 with the stored ECC bits (e.g., ECC bits 305). If the two sets of ECC bits match, then comparator 312 may forego signaling counter 320 to change (for example, increment) a current count of data errors. If the computed ECC bits do not match the stored ECC bits, then data bits 303 may contain an error. In such embodiments, if the two sets of ECC bits do not match, then comparator 312 may signal counter 320 to change (for example, increment) a current count of data errors. In some embodiments, error detection logic 307 includes or couples to ECC correction logic (not shown) to correct data errors.

Based on error counting operations by error detection logic 307, counter 320 may output a value 330 representing a total number of data errors, of at least one error type, that have been detected for one or more memory arrays 301. Value 330 may be further processed by calculation circuitry of memory device 300, where such processing is to calculate a relative error count value. Such calculation circuitry is represented by the illustrative adder 334, although other circuitry may be provided according to different embodiments. In an embodiment, memory device 300 is configured to store or otherwise provide a value 332 representing a baseline number of data errors previously determined at some reference time $t_0$. Although certain embodiments are not limited in this regard, a complement representation of $T_0$ value 332 as a negative number may be provided to adder 334 to facilitate an addition that generates a relative error count 320 that is less than value 330. Relative error count 322 may then be output from memory device 300 and/or stored in a register or other such repository of memory device 300.

Memory device 300 may include access logic 314 comprising circuitry to retrieve relative error count 322 for transmission to a requester—e.g. via a memory controller. In some embodiments, access logic 314 or other such logic of memory device 300 prepares information representing relative error count 322 to be provided to a memory controller or other agent coupled to memory device 300 via an input/output (I/O) interface 340.

In an embodiment, relative error count 322 may be limited to some maximum limit value. Such a maximum value may prevent an external agent from inducing data errors in memory device 300 to cause a rollover of relative error count 322. But for such a maximum limit value, a rollover of relative error count 322 might otherwise allow for an external agent to retrieve from memory device 300 information that directly or indirectly identifies $T_0$ value 332.

Figure 4:
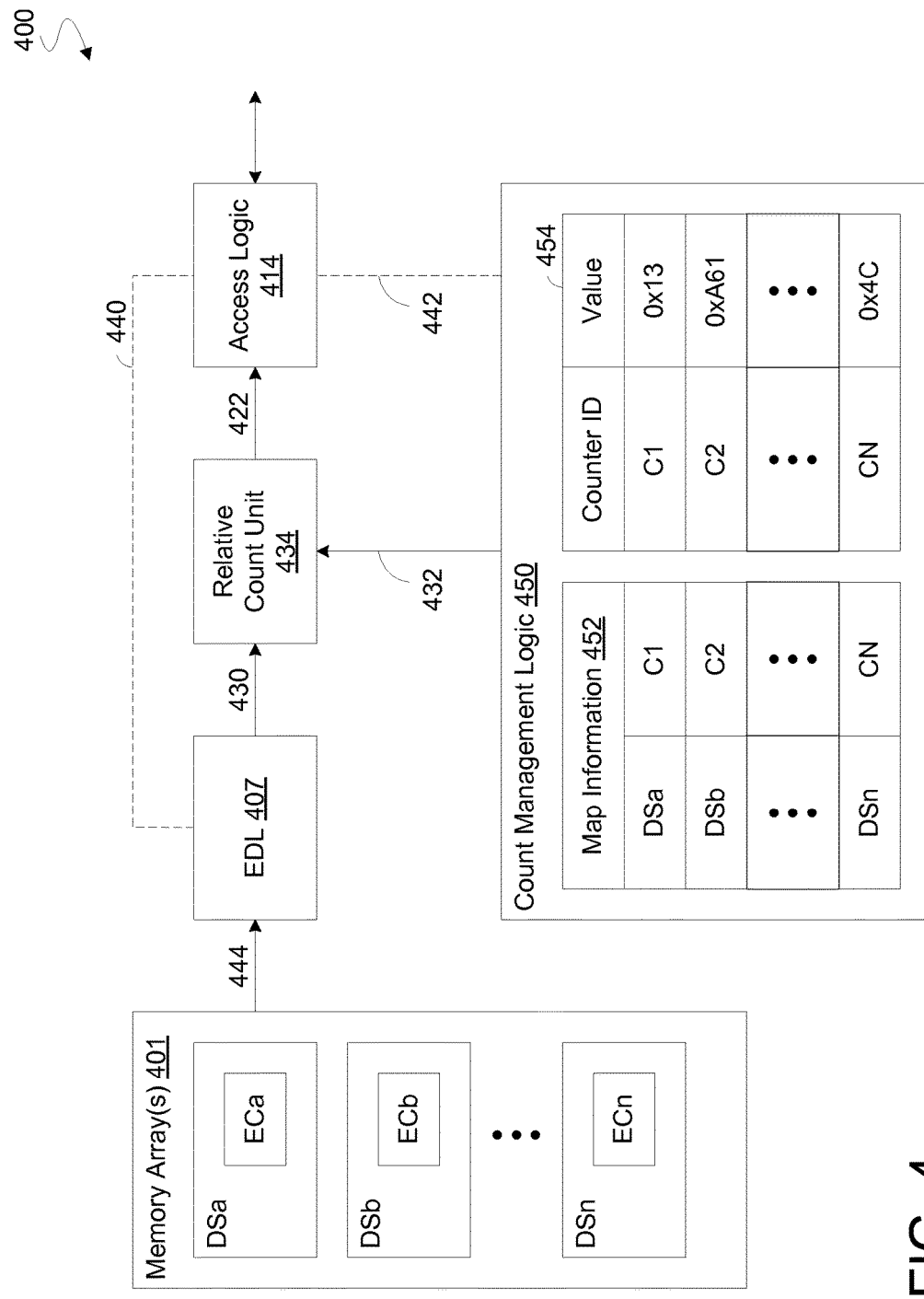
FIG. 4 is a block diagram illustrating elements of a memory device for providing an error count value according to an embodiment.

FIG. 4 is a block diagram illustrating elements of a memory device 400 to limit access to data error information according to an embodiment. Memory device 400 may include features of one of memory devices 130, 300, for example. In an embodiment, operation of memory device 400 is according to method 200.

In the illustrative embodiment shown, memory device 400 includes one or more memory arrays 401 and error detection logic (EDL) 407. One or more memory arrays 401 may include multiple subsets of memory resources—e.g., wherein respective error count information is maintained by memory device 400 for each such subset. Based on such error count information, memory device 400 may variously provide one or more relative error counts to a memory controller and/or other host logic. Such host logic may be restricted, however, from directly accessing at least some baseline error information on which the one or more relative error counts are based. For example, memory device 400 may store, for each of multiple subsets of memory resources, respective information that specifies or otherwise indicates a number of one or more data errors previously determined for that subset. Such numbers may be distinguished, for example, from current counts of data errors in the subsets of memory resources.

By way of illustration and not limitation, memory resources of one or more memory arrays 401 may include subsets DSa, DSb, . . . , DSn that are each to store respective data and, in some embodiments, respective error detection information (such as the illustrative error detection information ECa, EBb, . . . , ECn). Subsets DSa, DSb, . . . , DSn may each include a respective portion (or portions) of one or more memory arrays—e.g., where each of subsets DSa, DSb, . . . , DSn is a respective one or more memory arrays. In one embodiment, subsets DSa, DSb, . . . , DSn correspond to different respective IC chips of memory device 400.

EDL 407 may calculate an error detection value for data stored by (or to be stored by) one or more memory arrays 401. Such data may be provided to EDL 407, for example, in an exchange 444 with one or more memory arrays 401 or, alternatively, from access logic 414 of memory device 400. To detect for an error of the data, the calculated error detection value may be subsequently processed with another error detection value that, for example, is calculated based on an earlier (or alternatively, a later) version of such data.

In one embodiment, EDL 407 (or alternatively, logic coupled to EDL 407) determines a count of errors for at least some resources of one or more memory arrays 401. Such a count may be specific, for example, to errors in some or all of subsets DSa, DSb, . . . , DSn. A count value 430 may be communicated from EDL 407 to a relative count unit 434 comprising circuitry that is to generate a relative count value 422 based on count value 430. For example, relative count unit 434 may adjust the count value 430 based on a value 432 representing a number of one or more errors that were previously determined for the memory resources corresponding to count value 430.

By way of illustration and not limitation, memory device 400 may further comprise count management logic 450 including counters 454 and map information 452 variously associating counters 454 each with a respective one of subsets DSa, DSb, . . . , DSn. In an illustrative scenario according to one embodiment, access logic 414 provides to EDL 407 a request 440 for a count of errors for memory resources including DSb. To assure that only a relative error count (as distinguished from an absolute error count) is sent from the memory device, access logic 414 may further send a message 442 for count management logic 450 to provide to relative count unit 434 a value 432 representing a baseline number of data errors in DSb. In response to message 442, count management logic 450 may access map information 452 that corresponds DSa, DSb, . . . , DSn to counters C1, C2, . . . , CN, respectively. In response to determining that DSb corresponds to counter C2, count management logic 450 may determine from counter C2 a baseline number of data errors (in this illustrative example, 0xA61) for DSb. The value (or information to determine such a value) may be provided, for example, as value 432. Based on value 432 and count value 430, relative count unit 434 may determine, and provide to access logic 414, a relative count value 422. In some embodiments, counters 454 variously store encrypted or otherwise obscured representation of baseline data error counts, wherein relative count unit 434 includes decryption and/or other security logic to derive a relative count value based on information from counters 454. The multiple values variously stored by counters 454 may provide a basis for evaluating, with high granularity, degradation of DSa, DSb, . . . , DSn. However, such detailed information about memory device 400 may be restricted to only certain approved agents, in various embodiments.

Figure 5:
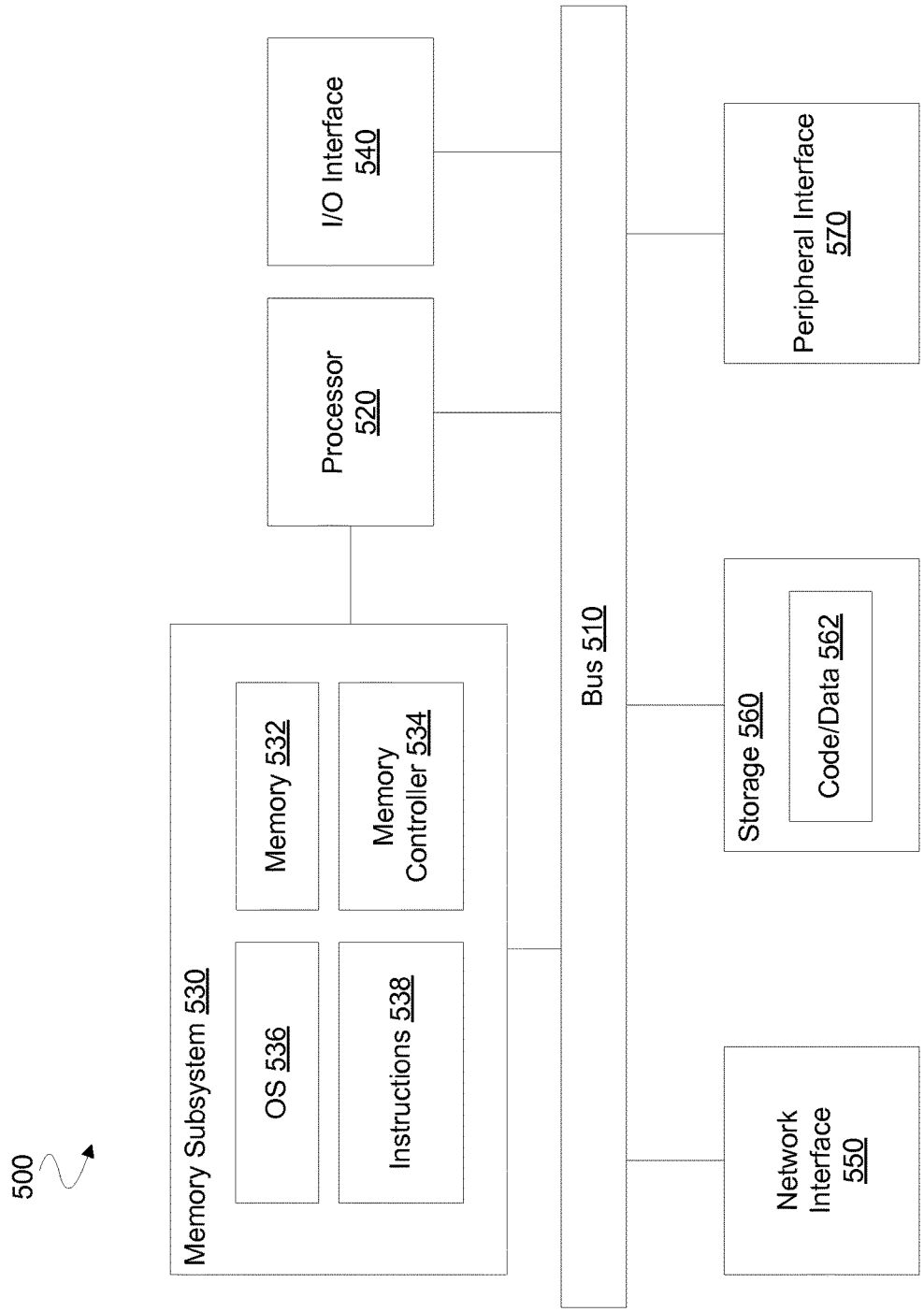
FIG. 5 is a block diagram illustrating elements of a computing system for communicating data error information according to an embodiment.

FIG. 5 is a block diagram of an embodiment of a computing system in which error detection may be implemented. System 500 represents a computing device in accordance with any embodiment described herein, and may be a laptop computer, a desktop computer, a server, a gaming or entertainment control system, a scanner, copier, printer, or other electronic device. System 500 may include processor 520, which provides processing, operation management, and execution of instructions for system 500. Processor 520 may include any type of microprocessor, central processing unit (CPU), processing core, or other processing hardware to provide processing for system 500. Processor 520 controls the overall operation of system 500, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 may include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520.

Memory subsystem 530 may include memory device 532 where it stores data, instructions, programs, or other items. In one embodiment, memory subsystem includes memory controller 534, which is a memory controller in accordance with any embodiment described herein, and which provides mechanisms for monitoring performance of memory device 532. In one embodiment, memory controller 534 provides commands to memory device 532. The commands may be for memory device 532 to provide state information describing one or more data errors detected (and in some embodiments, corrected) locally at memory device 532.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 may also correspond to interfaces in network interface 550.

System 500 may also include one or more input/output (I/O) interface(s) 540, network interface 550, one or more internal mass storage device(s) 560, and peripheral interface 570 coupled to bus 510. I/O interface 540 may include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 may include an Ethernet adapter, wireless interconnection components, USB (universal serial bus), or other wired or wireless standards-based or proprietary interfaces.

Storage 560 may be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 may be generically considered to be a "memory," although memory 532 is the executing or operating memory to provide instructions to processor 520. Whereas storage 560 is nonvolatile, memory 532 may include volatile memory (i.e., the value or state of the data is indeterminate if power is interrupted to system 500).

Peripheral interface 570 may include any hardware interface not specifically mentioned above. Peripherals refer generally to devices that connect dependently to system 500. A dependent connection is one where system 500 provides the software and/or hardware platform on which operation executes, and with which a user interacts.

Figure 6:
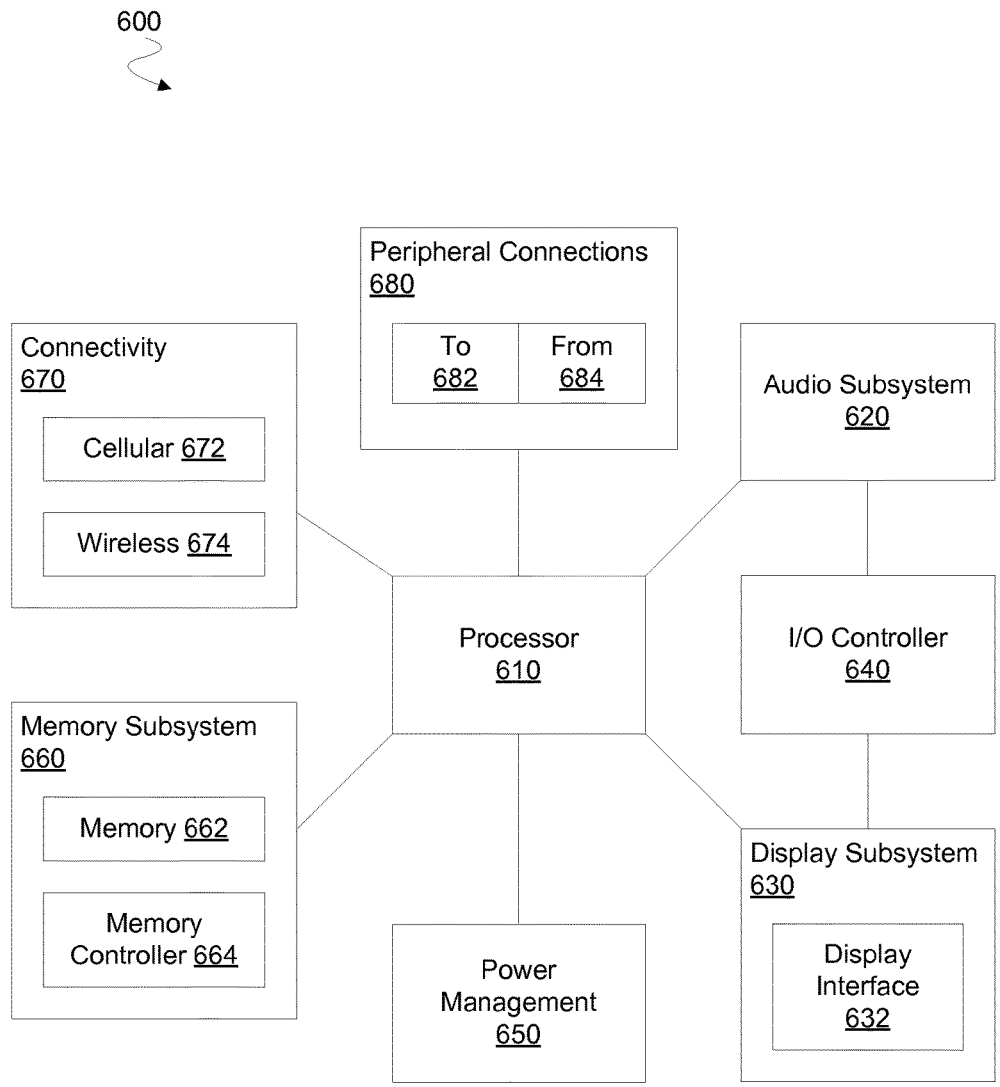
FIG. 6 is a block diagram illustrating elements of a mobile device for communicating error information according to an embodiment.

FIG. 6 is a block diagram of an embodiment of a mobile device in which error detection may be implemented. Device 600 represents a mobile computing device, such as a computing tablet, a mobile phone or smartphone, a wireless-enabled e-reader, or other mobile device. It will be understood that certain of the components are shown generally, and not all components of such a device are shown in device 600.

Device 600 may include processor 610, which performs the primary processing operations of device 600. Processor 610 may include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 may include display interface 632, which may include the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 may operate to manage hardware that is part of audio subsystem 620 and/or display subsystem 630. Additionally, I/O controller 640 illustrates a connection point for additional devices that connect to device 600 through which a user might interact with the system. For example, devices that may be attached to device 600 might include microphone devices, speaker or stereo systems, video systems or other display device, keyboard or keypad devices, or other I/O devices for use with specific applications such as card readers or other devices.

As mentioned above, I/O controller 640 may interact with audio subsystem 620 and/or display subsystem 630. For example, input through a microphone or other audio device may provide input or commands for one or more applications or functions of device 600. Additionally, audio output may be provided instead of or in addition to display output. In another example, if display subsystem includes a touchscreen, the display device also acts as an input device, which may be at least partially managed by I/O controller 640. There may also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that may be included in device 600. The input may be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 may include memory device(s) 662 for storing information in device 600. Memory subsystem 660 may include nonvolatile (state does not change if power to the memory device is interrupted) and/or volatile (state is indeterminate if power to the memory device is interrupted) memory devices. Memory subsystem 660 may store application data, user data, music, photos, documents, or other data, as well as system data (whether long-term or temporary) related to the execution of the applications and functions of device 600.

In one embodiment, memory subsystem 660 includes memory controller 664 (which could also be considered part of the control of device 600, and could potentially be considered part of processor 610). Memory controller 664 monitors performance of memory 662. For example, memory controller 664 may issue a command for memory 662 to provide state information describing one or more data errors.

Connectivity 670 may include hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 may include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector may allow device 600 to connect to certain peripherals that allow device 600 to control content output, for example, to audiovisual or other systems.

In addition to a proprietary docking connector or other proprietary connection hardware, device 600 may make peripheral connections 680 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a memory device comprises a hardware interface to couple the memory device to a memory controller, one or more memory arrays including circuitry configured to store data provided to the memory device from the memory controller via the hardware interface, and a first repository including circuitry configured to provide a first value representing a baseline number of one or more errors other than any error of data written to the one or more memory arrays by the memory controller. The memory device further comprises error detection logic including circuitry configured to access the one or more memory arrays, while the memory controller is coupled to the memory device, to determine a count of one or more data errors of at least a first error type, calculation logic to calculate a second value representing a difference between the count of data errors and the baseline number of one or more errors, a second repository to receive the second value from the calculation logic, and access logic including circuitry configured to service a command from a memory controller to access the second value.

In an embodiment, the baseline number of one or more errors comprises a count value determined before a packaging of the memory device. In another embodiment, the baseline number of one or more errors comprises a count value determined after a packaging of the memory device. In another embodiment, the baseline number of one or more errors comprises a count value determined after the memory device is coupled to a printed circuit board. In another embodiment, the baseline number of one or more errors comprises a count value determined before a most recent startup of a platform including the memory device.

In another embodiment, the memory device is configured to communicate with the memory controller according to an interface protocol, wherein any command to read the first repository comprises a command type other than any command type of the interface protocol. In another embodiment, the memory device is configured to communicate with the memory controller according to an interface protocol, wherein any command to determine an address of the first repository comprises a command type other than any command type of the interface protocol. In another embodiment, the memory device is configured to communicate with the memory controller according to an interface protocol, wherein any command to unlock an accessibility of the first repository comprises a command type other than any command type of the interface protocol.

In another embodiment, the calculation logic is to calculate the second value based on a rollover value. In another embodiment, the one or more memory arrays includes multiple subsets of memory resources, wherein, for each subset of the multiple subsets, the calculation logic to calculate a respective value representing a difference between a count of data errors of the subset, and a baseline number of one or more errors of the subset other than any error of data written to the subset by the memory controller. In another embodiment, the memory device comprises a packaged device including multiple integrated circuit (IC) chips, wherein, of multiple IC chips, the second value is specific to a first IC chip. In another embodiment, the memory device comprises an integrated circuit chip including multiple memory arrays, wherein of multiple memory arrays, the second value count is specific to a first memory array. In another embodiment, the calculation logic to calculate the second value includes the calculation logic to decrypt the first value.

In another implementation, a method at a memory device comprises retrieving a first value from a first repository of the memory device, the first value representing a baseline number of one or more errors other than any error of data written to one or more memory arrays of the memory device by a memory controller coupled to the memory device, accessing the one or more memory arrays, while the memory controller is coupled to the memory device, to determine a count of one or more data errors of at least a first error type, calculating a second value representing a difference between the count of data errors and the baseline number of one or more errors, and storing the second value at the memory device, wherein the second value is available to be accessed by the memory controller.

In an embodiment, the baseline number of one or more errors comprises a count value determined before a packaging of the memory device. In another embodiment, the baseline number of one or more errors comprises a count value determined after a packaging of the memory device. In another embodiment, the baseline number of one or more errors comprises a count value determined after the memory device is coupled to a printed circuit board. In another embodiment, the baseline number of one or more errors comprises a count value determined before a most recent startup of a platform including the memory device.

In another embodiment, the method further comprises communicating with the memory controller according to an interface protocol, wherein any command to read the first repository comprises a command type other than any command type of the interface protocol. In another embodiment, the method further comprises communicating with the memory controller according to an interface protocol, wherein any command to determine an address of the first repository comprises a command type other than any command type of the interface protocol. In another embodiment, the method further comprises communicating with the memory controller according to an interface protocol, wherein any command to unlock an accessibility of the first repository comprises a command type other than any command type of the interface protocol.

In another embodiment, calculating the second value is based on a rollover value. In another embodiment, the one or more memory arrays includes multiple subsets of memory resources, the method further comprises, for each subset of the multiple subsets, calculating a respective value representing a difference between a count of data errors of the subset, and a baseline number of one or more errors of the subset other than any error of data written to the subset by the memory controller. In another embodiment, the memory device comprises a packaged device including multiple integrated circuit (IC) chips, wherein, of multiple IC chips, the second value is specific to a first IC chip. In another embodiment, the memory device comprises an integrated circuit chip including multiple memory arrays, wherein of multiple memory arrays, the second value count is specific to a first memory array. In another embodiment, calculating the second value includes decrypting the first value.

In another implementation, a system comprises a memory controller, an interconnect, and a memory device including a hardware interface coupled to the memory controller via the interconnect, one or more memory arrays including circuitry configured to store data provided to the memory device from the memory controller via the hardware interface, and a first repository including circuitry configured to provide a first value representing a baseline number of one or more errors other than any error of data written to the one or more memory arrays by the memory controller. The memory device further comprises error detection logic including circuitry configured to access the one or more memory arrays, while the memory controller is coupled to the memory device, to determine a count of one or more data errors of at least a first error type, calculation logic to calculate a second value representing a difference between the count of data errors and the baseline number of one or more errors, a second repository to receive the second value from the calculation logic, and access logic including circuitry configured to service a command from a memory controller to access the second value.

In an embodiment, the baseline number of one or more errors comprises a count value determined before a packaging of the memory device. In another embodiment, the baseline number of one or more errors comprises a count value determined after a packaging of the memory device. In another embodiment, the baseline number of one or more errors comprises a count value determined after the memory device is coupled to a printed circuit board. In another embodiment, the baseline number of one or more errors comprises a count value determined before a most recent startup of a platform including the memory device.

In another embodiment, the memory device is configured to communicate with the memory controller according to an interface protocol, wherein any command to read the first repository comprises a command type other than any command type of the interface protocol. In another embodiment, the memory device is configured to communicate with the memory controller according to an interface protocol, wherein any command to determine an address of the first repository comprises a command type other than any command type of the interface protocol. In another embodiment, the memory device is configured to communicate with the memory controller according to an interface protocol, wherein any command to unlock an accessibility of the first repository comprises a command type other than any command type of the interface protocol.

In another embodiment, the calculation logic to calculate the second value based on a rollover value. In another embodiment, the one or more memory arrays includes multiple subsets of memory resources, wherein, for each subset of the multiple subsets, the calculation logic to calculate a respective value representing a difference between a count of data errors of the subset and a baseline number of one or more errors of the subset other than any error of data written to the subset by the memory controller. In another embodiment, the memory device comprises a packaged device including multiple integrated circuit (IC) chips, wherein, of multiple IC chips, the second value is specific to a first IC chip. In another embodiment, the memory device comprises an integrated circuit chip including multiple memory arrays, wherein of multiple memory arrays, the second value count is specific to a first memory array. In another embodiment, the calculation logic to calculate the second value includes the calculation logic to decrypt the first value.

Techniques and architectures for determining data error information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A memory device comprising:
   a first register to store a baseline number of single bit errors, the baseline number of single bit errors not readable by a memory controller, wherein the baseline number represents a number of errors present in the memory device at a reference time;
   an error detection circuit to detect a current number of single bit errors in a memory array of the memory device;
   calculation logic to compute a difference between the current number of single bit errors detected by the error detection circuit and the baseline number of single bit errors; and
   a second register to store the difference for access by the memory controller.

2. The memory device of claim 1, wherein the first register comprises a register having its accessibility locked by a security mechanism.

3. The memory device of claim 1, wherein the baseline number comprises a number of single bit errors determined prior to a packaging of the memory device.

4. The memory device of claim 1, wherein the baseline number comprises a number of single bit errors determined prior to a connection of the memory device to the memory controller.

5. The memory device of claim 1, wherein the baseline number comprises a number of single bit errors determined before a most recent startup of a platform including the memory device.

6. The memory device of claim 1, wherein the calculation logic is to calculate the difference based on a rollover value where the relative number rolls over after reaching a maximum count.

7. The memory device of claim 1, wherein the memory array includes multiple subsets of memory resources, wherein, for each subset of the multiple subsets, the calculation logic is to calculate a difference for each subset.

8. The memory device of claim 7, wherein each subset comprises a bank, and wherein the calculation logic is to calculate the difference based on a scan of a bank.

9. The memory device of claim 7, wherein the memory device comprises a packaged device including multiple integrated circuit (IC) chips, wherein each subset comprises a specific IC chip.

10. The memory device of claim 7, wherein the memory device comprises an integrated circuit chip including multiple memory arrays, wherein each subset comprises a specific memory array.

11. The memory device of claim 1, wherein the second register comprises a multipurpose register (MPR).

12. The memory device of claim 1, wherein a mode register set command to reset a single bit error count for the memory device is to reset the difference of the second register, and not reset the baseline number of the first register.

13. A method for error management of a memory device, comprising:
   retrieving a baseline number of single bit errors from a storage location not readable by a memory controller, wherein the baseline number represents a number of errors present in the memory device at a reference time;

detecting errors in data stored in a memory array of the memory device;

calculating a difference between a current number of detected single bit errors and the baseline number of single bit errors; and storing the difference for access by the memory controller.

14. The method of claim 13, further comprising locking the storage location of the baseline number of single bits errors with a privilege designation.

15. The method of claim 13, further comprising calculating the baseline number prior to a packaging of the memory device.

16. The method of claim 13, wherein calculating the relative number comprises calculating separate differences for different subsets of memory resources of the memory device.

17. The method of claim 13, further comprising resetting the difference of single bit errors without resetting the baseline number of single bit errors.

18. A system comprising:

a memory controller; and a memory device coupled to the memory controller, the memory device including:

a first register to store a baseline number of single bit errors, the baseline number of single bit errors not readable by the memory controller, wherein the baseline number represents a number of errors present in the memory device at a reference time;

an error detection circuit to detect a current number of single bit errors in a memory array of the memory device;

calculation logic to compute a difference between the current number of single bit errors detected by the error detection circuit and the baseline number of single bit errors; and a second register to store the difference for access by the memory controller.

19. The system of claim 18, wherein the first register comprises a register having its accessibility locked by a security mechanism.

20. The system of claim 18, wherein the baseline number comprises a number of single bit errors determined prior to a packaging of the memory device.

21. The system of claim 18, wherein the baseline number comprises a number of single bit errors determined prior to a connection of the memory device to the memory controller.

22. The system of claim 18, wherein the baseline number comprises a number of single bit errors determined before a most recent startup of a platform including the memory device.

23. The system of claim 18, wherein the memory array includes multiple subsets of memory resources, wherein, for each subset of the multiple subsets, the calculation logic is to calculate a difference for each subset.

24. The system of claim 18, wherein a mode register set command to reset a single bit error count for the memory device is to reset the difference of the second register, and not reset the baseline number of the first register.

25. The system of claim 18, further comprising at least one processor and a network interface, the at least one processor communicatively coupled to the memory controller and the network interface communicatively coupled to the at least one processor.

* * * * *